United States Patent
Han (10) Patent No.: US 10,768,724 B1
(45) Date of Patent: Sep. 8, 2020

(54) MOUSE DEVICE AND COMPUTER CONTROL SYSTEM THEREOF

(71) Applicant: Tai-Sheng Han, New Taipei (TW)

(72) Inventor: Tai-Sheng Han, New Taipei (TW)

(73) Assignee: EVGA CORPORATION, New Taipei (TW)

( * ) Notice: Subject to any disclaimer, the term of this patent is extended or adjusted under 35 U.S.C. 154(b) by 0 days.

(21) Appl. No.: 16/429,420

(22) Filed: Jun. 3, 2019

(51) Int. Cl.
| | |
|---|---|
| *G09G 1/00* | (2006.01) |
| *G06F 3/038* | (2013.01) |
| *G06F 3/03* | (2006.01) |
| *G06F 3/0354* | (2013.01) |

(52) U.S. Cl.
CPC .......... *G06F 3/0383* (2013.01); *G06F 3/0304* (2013.01); *G06F 3/03543* (2013.01)

(58) Field of Classification Search
CPC ...... G06F 3/0354; G06F 3/033; G06F 3/0317; G06K 1/00
See application file for complete search history.

(56) References Cited

U.S. PATENT DOCUMENTS

| | | | | |
|---|---|---|---|---|
| 2009/0303184 A1* | 12/2009 | Tao | ........................ | G06F 3/0231 345/163 |
| 2015/0169087 A1* | 6/2015 | Kim | ...................... | G06F 3/0383 345/166 |

\* cited by examiner

*Primary Examiner* — Michael A Faragalla
(74) *Attorney, Agent, or Firm* — Che-Yang Chen; Law Office of Michael Chen (57) ABSTRACT

A mouse device and a computer control system thereof, comprising a mouse and an optical sensing module. The mouse has electrically connected press buttons, light-emitting component and mouse processing unit set with an initial setting command. The optical sensing module is disposed on the mouse and electrically connected to the mouse processing unit, and has a light source emitting unit generating a sensing signal, and a light source receiving unit. The mouse processing unit transmits the sensing signal to a host processing unit of a host computer. Thereby, the optical sensing module senses a user approaches the mouse or generation of gestures to generate the sensing signal. The mouse processing unit drives the light-emitting component to generate an initial light source. The host processing unit generates an advanced control signal to drive the light-emitting component, an operation unit and peripheral devices to generate advanced actions of an advanced setting command.

5 Claims, 11 Drawing Sheets

MOUSE DEVICE AND COMPUTER CONTROL SYSTEM THEREOF

BACKGROUND OF THE INVENTION

Field of Invention

The present invention relates to a mouse device and a computer control system thereof, and more particularly to a mouse device and a computer control system thereof that automatically cause a mouse to generate a light source as well as a computer and computer peripherals to generate actions through optical sensing to improve the use experience.

Related Art

In this era of technology explosion, people rely on a variety of electronic products to make life more convenient and diverse, and use electronic products to improve efficiency and productivity to save a lot of time. Among the electronic products, computer device has already become one of the indispensable and important tools in people's lives, and besides the host computer as the main equipment of a computer device, the mouse is also a very important equipment for the computer device. The mouse is arranged through the system for controlling a cursor by clicking to operate a machine or equipment and can be used to control the operation of the computer. When using the computer device or the mouse, the user needs to use a specific software or a specific press button on the mouse to drive the computer or control a specific function on the keyboard or to drive peripheral devices to activate behaviors such as light effects of the mouse or wake-up of the computer. However, in the current technology, the user needs to touch the mouse with the hand and operate in order to achieve the above objects, and thus causing the user being unable to experience the activation by automatic sensing.

Therefore, how to solve the above problems and drawbacks in the prior art is what the inventor of the present invention and relevant manufacturers engaged in this industry are eager to research and make improvement.

SUMMARY OF THE INVENTION

Therefore, in order to effectively solve the above problems, a main object of the present invention is to provide a mouse device and a computer control system thereof that automatically cause a mouse to generate a light source as well as a computer and computer peripherals to generate actions through optical sensing to improve the use experience.

In order to achieve the above object, the present invention provides a mouse device comprising a mouse and an optical sensing module, wherein the mouse is formed with a hold surface at an upper side position, and the hold surface is disposed with a plurality of press buttons and at least one light-emitting component. Inside the mouse is disposed with a mouse processing unit, the mouse processing unit is electrically connected to the press buttons and the light-emitting component, and an initial setting command is set in the mouse processing unit. The mouse processing unit is capable of generating at least one initial control signal according to the initial setting command. The optical sensing module is disposed at a position of the hold surface of the mouse. The optical sensing module is electrically connected to the mouse processing unit, and the optical sensing module has a light source emitting unit and a light source receiving unit, the light source emitting unit emits a light of a specific wavelength range, and the light source receiving unit receives a reflected light. The optical sensing module generates a sensing signal after the light source receiving unit receives the reflected light, and the sensing signal is transmitted to the mouse processing unit, and the mouse processing unit generates the initial control signal to drive the light-emitting component to generate an initial light source of the initial setting command. Whereby when a user approaches the mouse device, the optical sensing module senses that the user approaches the mouse or generation of gestures to generate the sensing signal, and the mouse processing unit drives the light-emitting component to generate the initial light source of the initial setting command, and thus achieving the effect of automatically causing the mouse to generate a light source to improve the use experience.

According to an embodiment of the mouse device of the present invention, wherein the mouse further has a signal transmission interface, and the signal transmission interface is electrically connected to the mouse processing unit.

The present invention further provides a computer control system comprising a host computer, a mouse and an optical sensing module, wherein the host computer has a plurality of signal connection interfaces, a host processing unit and at least one operation unit. The signal connection interfaces are electrically connected to the host processing unit, and the host processing unit has an advanced setting command and is capable of generating at least one advanced control signal according to the advanced setting command. The mouse is electrically connected to the host computer, the mouse is formed with a hold surface at an upper side position, and the hold surface is provided with a plurality of press buttons and at least one light-emitting component. Inside the mouse is disposed with a mouse processing unit, the mouse processing unit is electrically connected to the press buttons and the light-emitting component, and an initial setting command is set in the mouse processing unit. The mouse processing unit is capable of generating at least one initial control signal according to the initial setting command. The optical sensing module is disposed at a position of the hold surface of the mouse. The optical sensing module is electrically connected to the mouse processing unit, and the optical sensing module has a light source emitting unit and a light source receiving unit, the light source emitting unit emits a light of a specific wavelength range, and the light source receiving unit receives a reflected light. The optical sensing module generates a sensing signal after the light source receiving unit receives the reflected light, and the sensing signal is transmitted to the mouse processing unit, and the mouse processing unit generates the initial control signal to drive the light-emitting component to generate an action light source of the initial setting command. The mouse processing unit transmits the sensing signal to the host processing unit of the host computer, and the host processing unit generates the advanced control signal to drive the operation unit to generate actions of the advanced setting command. Whereby when a user approaches the mouse device, the optical sensing module senses that the user approaches the mouse or generation of gestures to generate the sensing signal, and the mouse processing unit drives the light-emitting component to generate an initial light source of the initial setting command, and the host processing unit generates the advanced control signal to drive the operation unit to generate an advanced light source of the advanced setting command, and thus achieving the effects of automatically causing the mouse to generate a light source and the host computer to generate actions to improve the use experience.

According to an embodiment of the computer control system of the present invention, wherein the mouse processing unit transmits the sensing signal to the signal connection interfaces of the host computer via the signal transmission interface, and the signal connection interfaces transmit the sensing signal to the host processing unit.

According to an embodiment of the computer control system of the present invention, wherein the mouse processing unit transmits the sensing signal to the host processing unit of the host computer, and the host processing unit generates the advanced control signal to drive the light-emitting component to generate the advanced light source of the advanced setting command.

According to an embodiment of the computer control system of the present invention, wherein the host processing unit transmits the advanced control signal to the signal transmission interface of the mouse via the signal connection interfaces, the signal transmission interface transmits the advanced control signal to the mouse processing unit, and the mouse processing unit drives the light-emitting component to generate the advanced light source of the advanced setting command.

According to an embodiment of the computer control system of the present invention, wherein the host processing unit generates the advanced control signal to drive the operation unit to generate the actions of the advanced setting command.

According to an embodiment of the computer control system of the present invention, further comprising at least one peripheral device, the peripheral device having a signal receiving interface and a device processing unit, wherein the signal receiving interface is electrically connected to the signal connection interfaces, the mouse processing unit transmits the sensing signal to the host processing unit of the host computer, and the host processing unit generates the advanced control signal to drive the peripheral device to generate the actions of the advanced setting command.

According to an embodiment of the computer control system of the present invention, wherein the host processing unit transmits the advanced control signal to the signal receiving interface of the peripheral device via the signal connection interfaces, the signal receiving interface transmits the advanced control signal to the device processing unit, and the device processing unit drives the peripheral device to generate the actions of the advanced setting command.

DETAILED DESCRIPTION OF THE INVENTION

The above objects and structural and functional features of the present invention will be described in accordance with the preferred embodiments with reference to the accompanying drawings.

Figure 1:
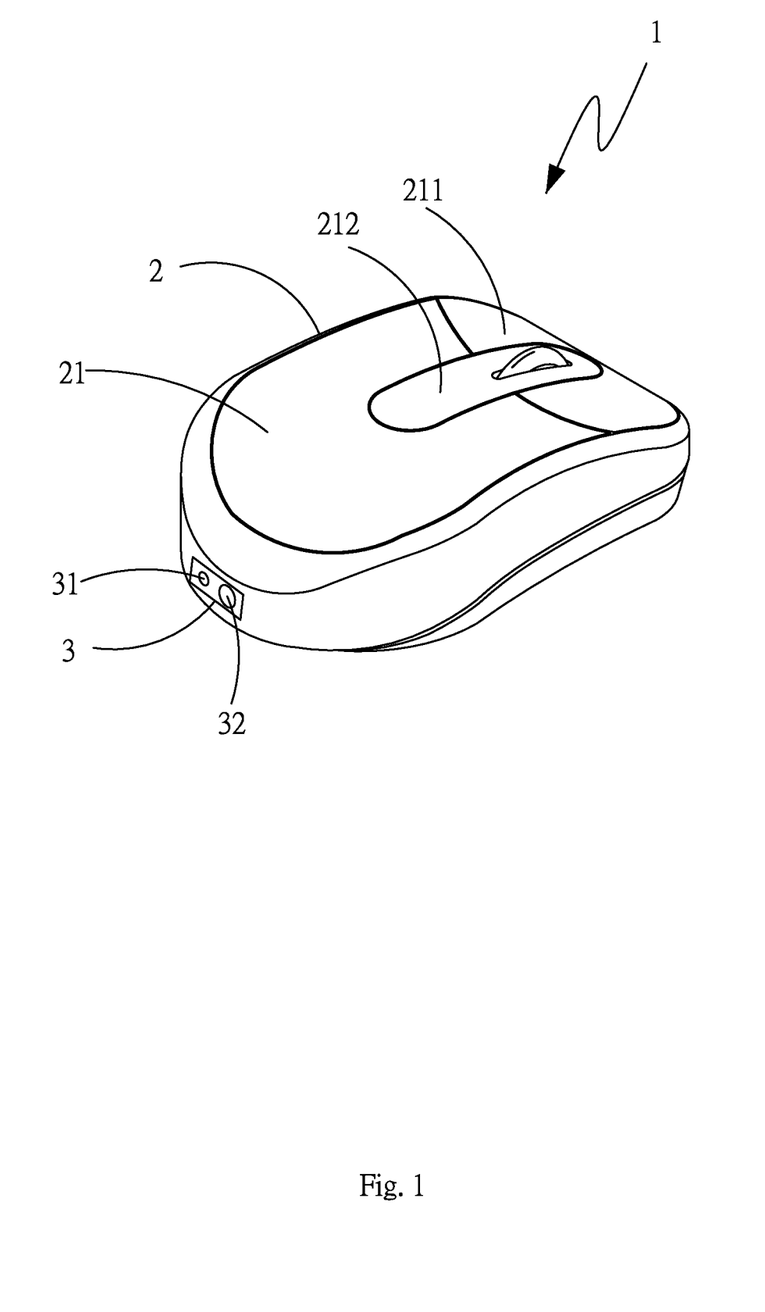
FIG. 1 is a perspective view of a mouse device of the present invention.
Figure 2:
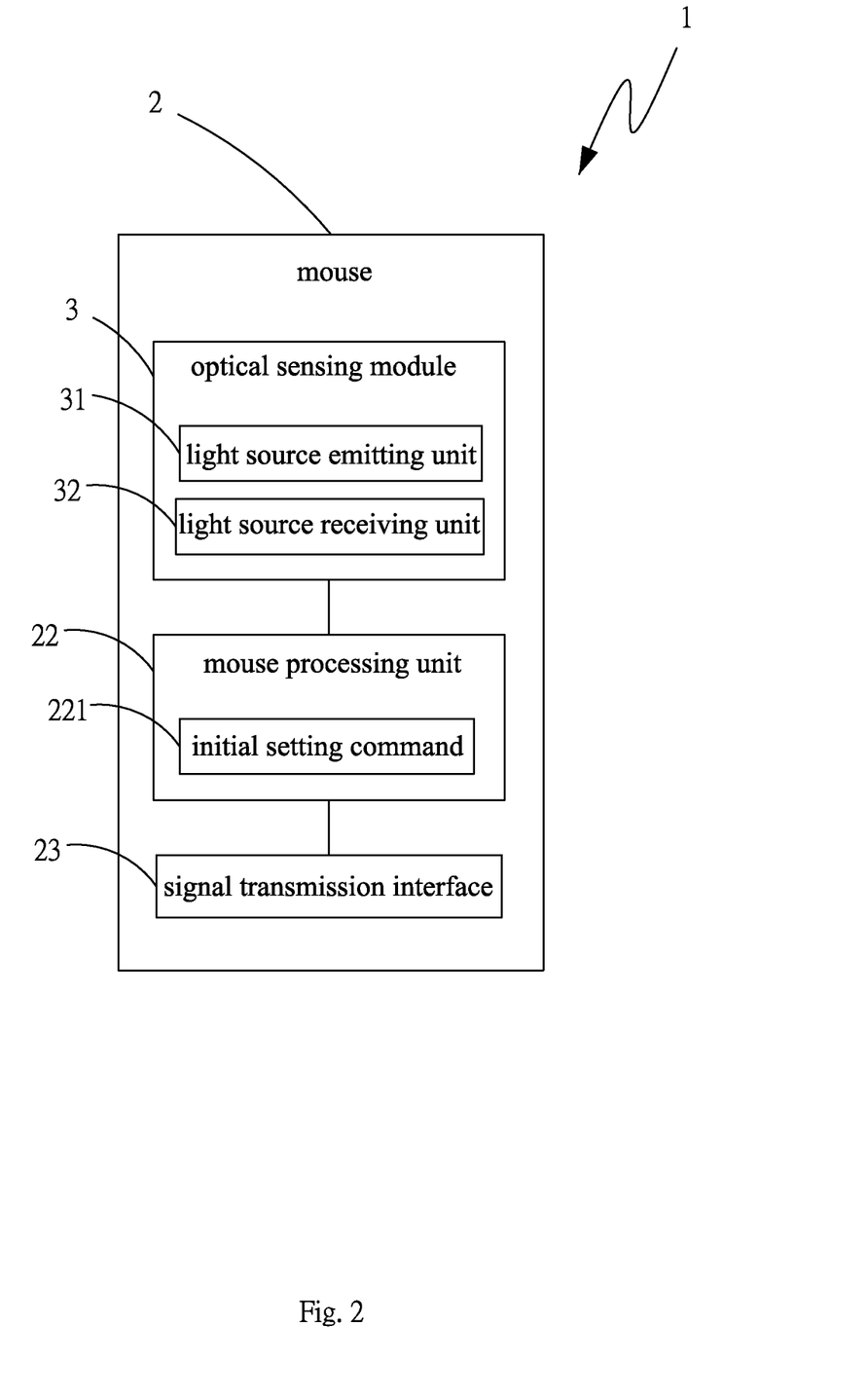
FIG. 2 is a block diagram of the mouse device of the present invention.

Please refer to FIG. 1 and FIG. 2, which are perspective view and block diagram of a mouse device 1 of the present invention. It can be clearly seen from the figures that, the mouse device 1 comprises a mouse 2 and an optical sensing module 3.

The mouse 2 is formed with a hold surface 21 at an upper side position and disposed with a mouse processing unit 22 therein. The hold surface 21 is provided with a plurality of press buttons 211 and at least one light-emitting component 212, and the press buttons 211 and the light-emitting component 212 are electrically connected to the mouse processing unit 22. The light-emitting component 212 can be a light-emitting element of the press buttons 211, or a light-emitting element on the hold surface 21, or a light-emitting element around the mouse 2, or another light-emitting element on the mouse 2. The mouse processing unit 22 is set with an initial setting command 221, the mouse 2 further has a signal transmission interface 23, and the signal transmission interface 23 is electrically connected to the mouse processing unit 22.

The optical sensing module 3 is disposed at a position of the hold surface 21 of the mouse 2, and the optical sensing module 3 can be set with an sensing angle according to the shape of the mouse 2. In this embodiment, the sensing angle of the optical sensing module 3 is a small angle between the optical sensing module 3 and a desktop. Contrarily, if the mouse 2 has a wrist rest, the sensing angle of the optical sensing module 3 needs to avoid the wrist rest and is a large angle between the optical sensing module 3 and the desktop. The optical sensing module 3 is electrically connected to the mouse processing unit 22, and the optical sensing module 3 has a light source emitting unit 31 and a light source receiving unit 32. Wherein the light source emitting unit 31 is capable of emitting a laser light of a specific wavelength range, the light source receiving unit 32 receives a reflected light of the laser light, and a range in which the light source receiving unit 32 receives the reflected light is larger than a range in which the light source emitting unit 31 emits the light irradiation.

Figure 3:
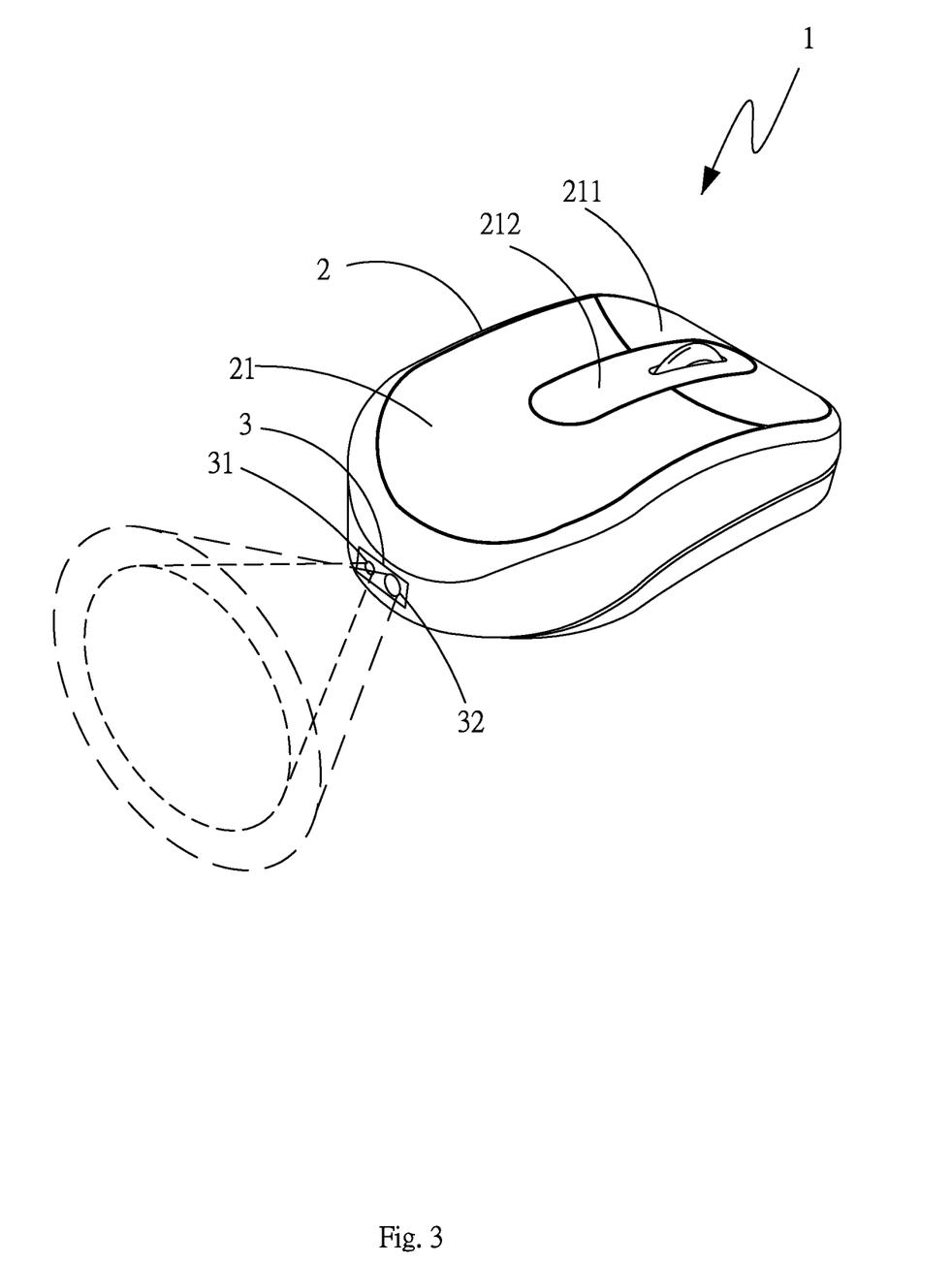
FIG. 3 is a first schematic view of the implementation of the mouse device of the present invention.
Figure 4:
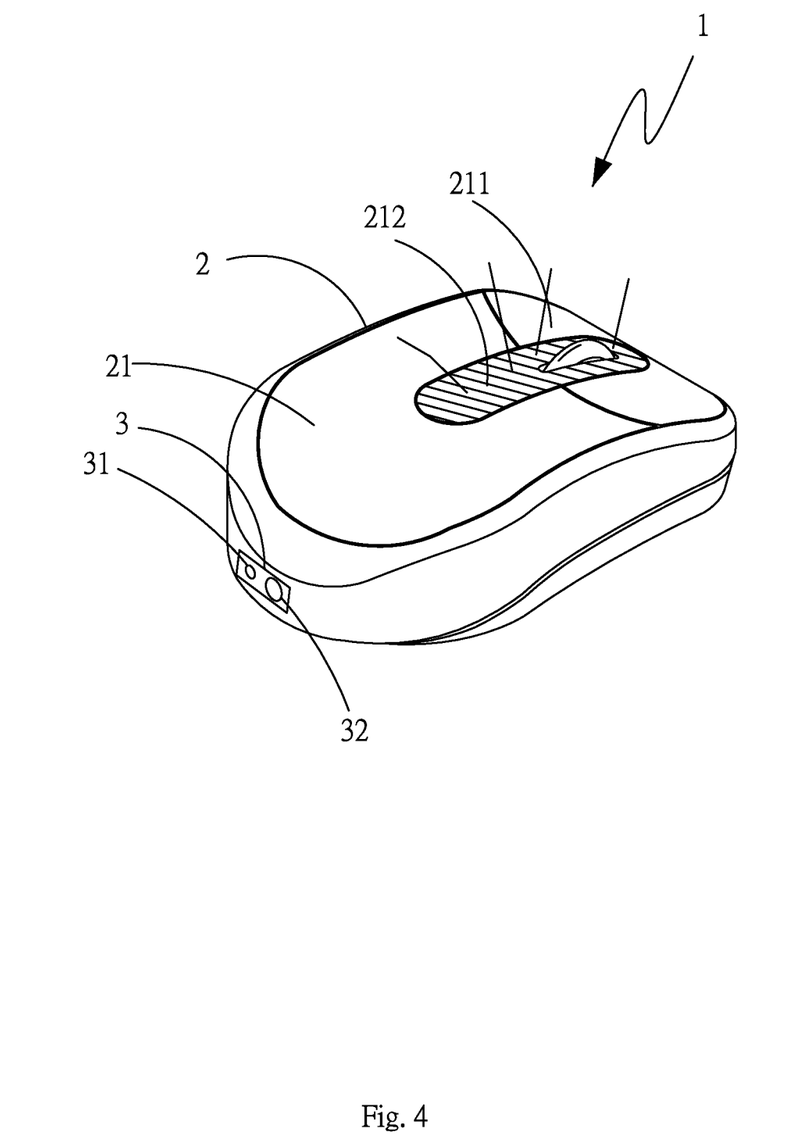
FIG. 4 is a second schematic view of the implementation of the mouse device of the present invention.
Figure 5:
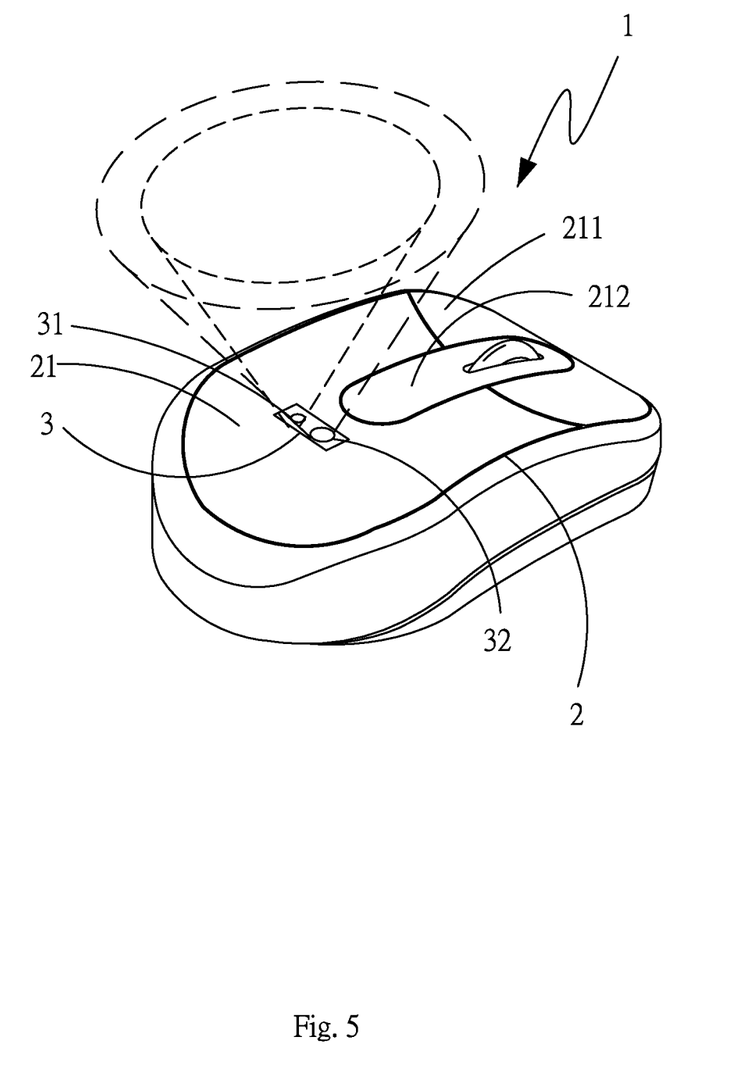
FIG. 5 is a third schematic view of the implementation of the mouse device of the present invention.

Referring to the foregoing drawings and FIGS. 3, 4 and 5 as well, which are first schematic view, second schematic view and third schematic view of the implementation of the mouse device 1 of the present invention. When the mouse device 1 is in use, the light source emitting unit 31 continuously emits a laser light of a specific wavelength range, and the light source receiving unit 32 receives a reflected light of the laser light. When a user approaches the mouse device 1 or gestures near the mouse device 1, the light source receiving unit 32 receives the reflected light reflected by the user or receives the gestures by the reflected light. The optical sensing module 3 generates a sensing signal after the light source receiving unit 32 receives the reflected light, the sensing signal is transmitted to the mouse processing unit 22, and the mouse processing unit 22 generates an initial control signal to drive the light-emitting component 212 to generate an initial light source of an initial setting command. Wherein the initial light source can be a fixed light source or an action light source, the fixed light source is a light source of monochromatic illumination, and the action light source can be a light source that is not only a simple light, such as a flashing light or an electronic scroll or a change in the color of the light. Thereby when the user approaches the mouse device 1, the optical sensing module 3 senses that the user approaches the mouse 2 or generation of gestures to generate the sensing signal, and the mouse processing unit 22 drives the light-emitting component 212 to generate the initial light source of the initial setting command, and thus achieving the effect of automatically causing the mouse 2 to generate the light source to improve the use experience. The optical sensing module 3 can be selectively disposed at a position of the hold surface 21 according to requirements, for example, disposed at a position of the hold surface 21 adjacent to the user, or disposed at a top position of the hold surface 21. When the optical sensing module 3 is disposed at a top position of the hold surface 21, and when the user wants to hold the hold surface 21 with the palm, the light source receiving unit 32 receives the reflected light reflected by the palm or receives the gestures by the reflected light. The optical sensing module 3 generates the sensing signal after the light source receiving unit 32 receives the reflected light, the sensing signal is transmitted to the mouse processing unit 22, and the mouse processing unit 22 generates the initial control signal to drive the light-emitting component 212 to generate the action light source of the initial setting command.

Figure 6:
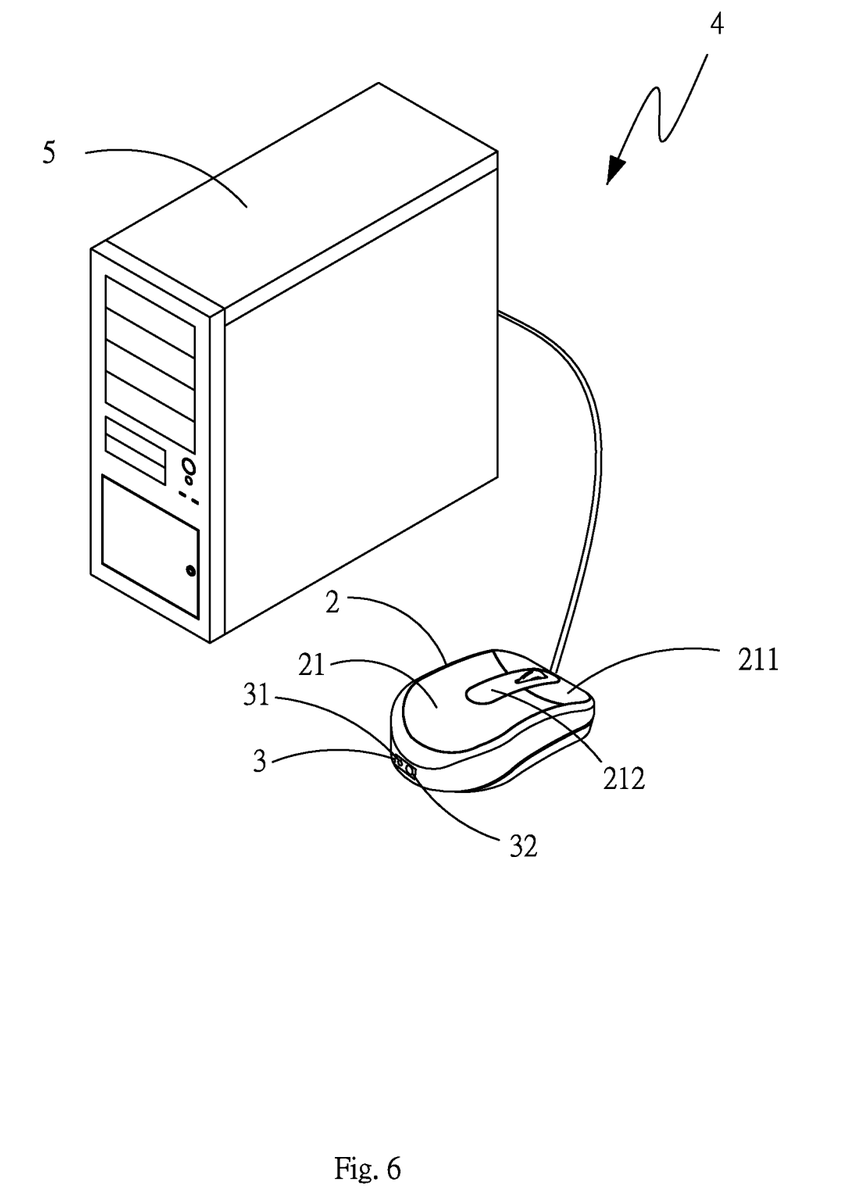
FIG. 6 is a perspective view of a computer control system of the present invention.
Figure 7:
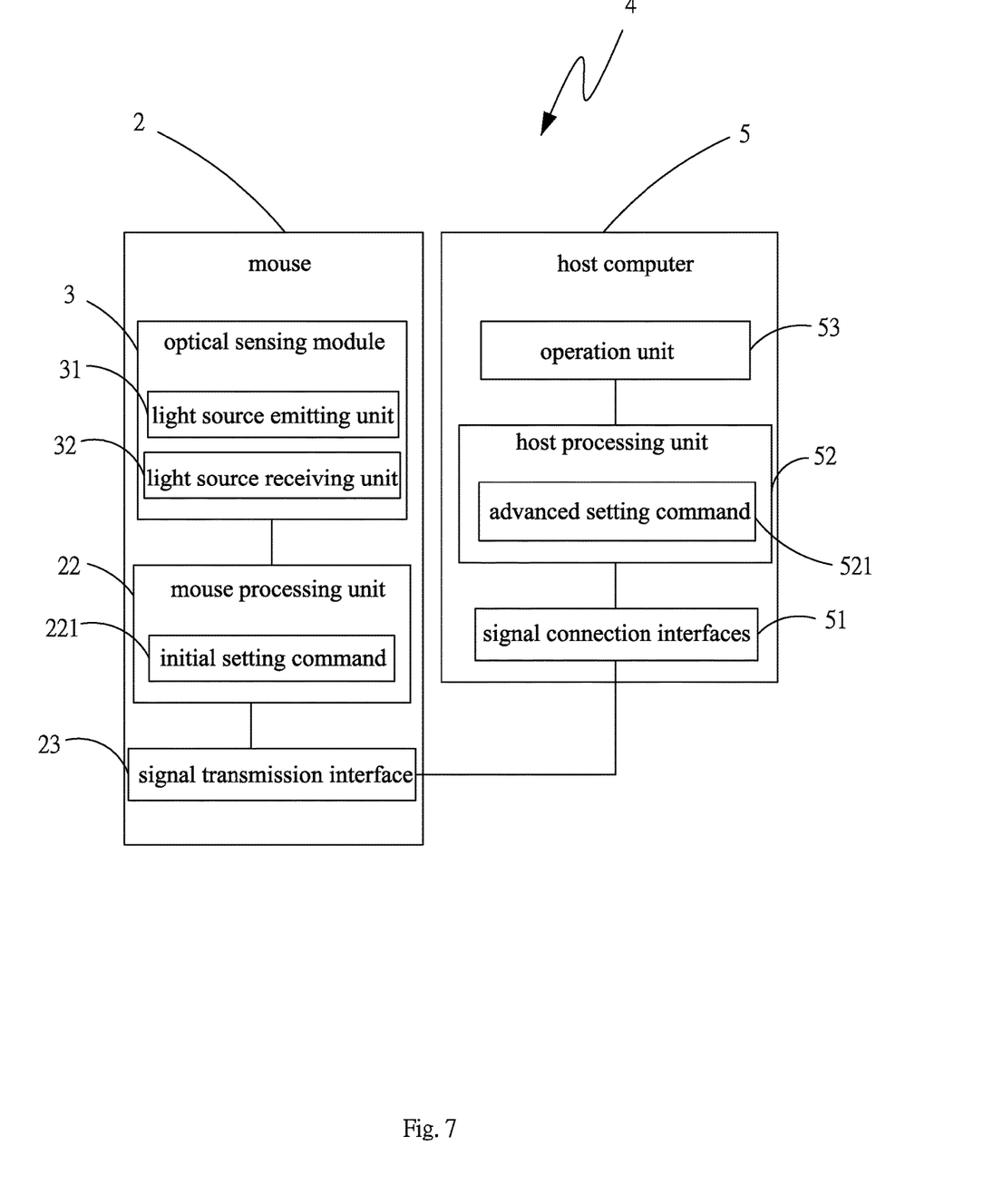
FIG. 7 is a block diagram of the computer control system of the present invention.

Please refer to FIG. 6 and FIG. 7, which are perspective view and block diagram of a computer control system 4 of the present invention. It can be clearly seen from the figures that the computer control system 4 comprises a host computer 5, the mouse 2 and the optical sensing module 3.

The host computer 5 has a plurality of signal connection interfaces 51, a host processing unit 52 and at least one operation unit 53. Wherein the operation unit 53 can be a computer device disposed in the host computer 5 such as a power supply, a fan or a heat sink or the like. The signal connection interfaces 51 are electrically connected to the host processing unit 52. The host processing unit 52 is provided with an advanced setting command 521, actions of the advanced setting command 521 can be activating, deactivating, continuing, or the like, or the actions of the advanced setting command 521 can activate a light-emitting element on the operation unit 53 to generate an advanced light source. Wherein the mouse 2 and the optical sensing module 3 are assembled and operated in the same manner as the above embodiment, and will not be further described herein. In addition, the signal transmission interface 23 of the mouse 2 is electrically connected to the signal connection interfaces 51 of the host computer 5.

Figure 8:
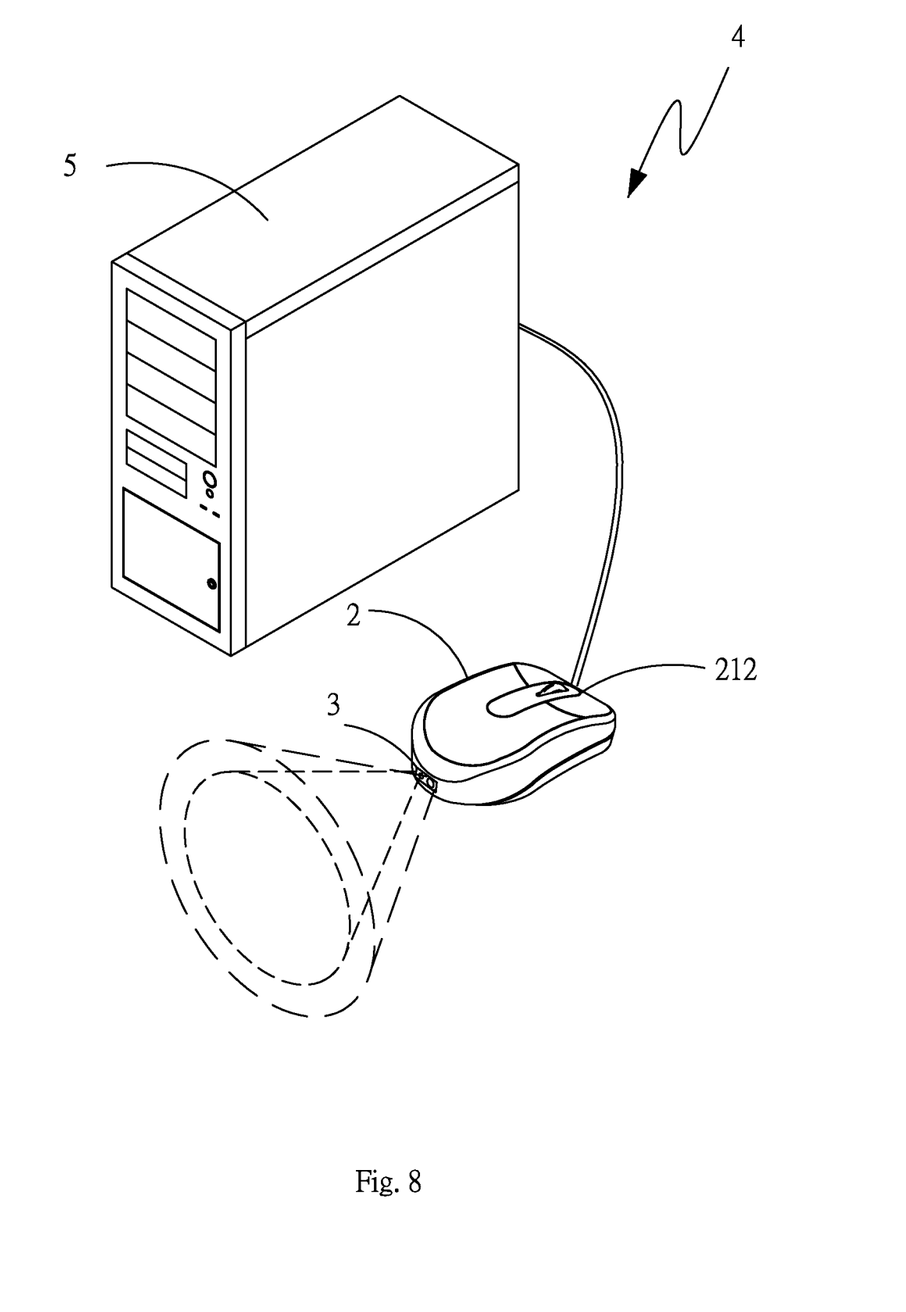
FIG. 8 is a first schematic view of the implementation of the computer control system of the present invention.
Figure 9:
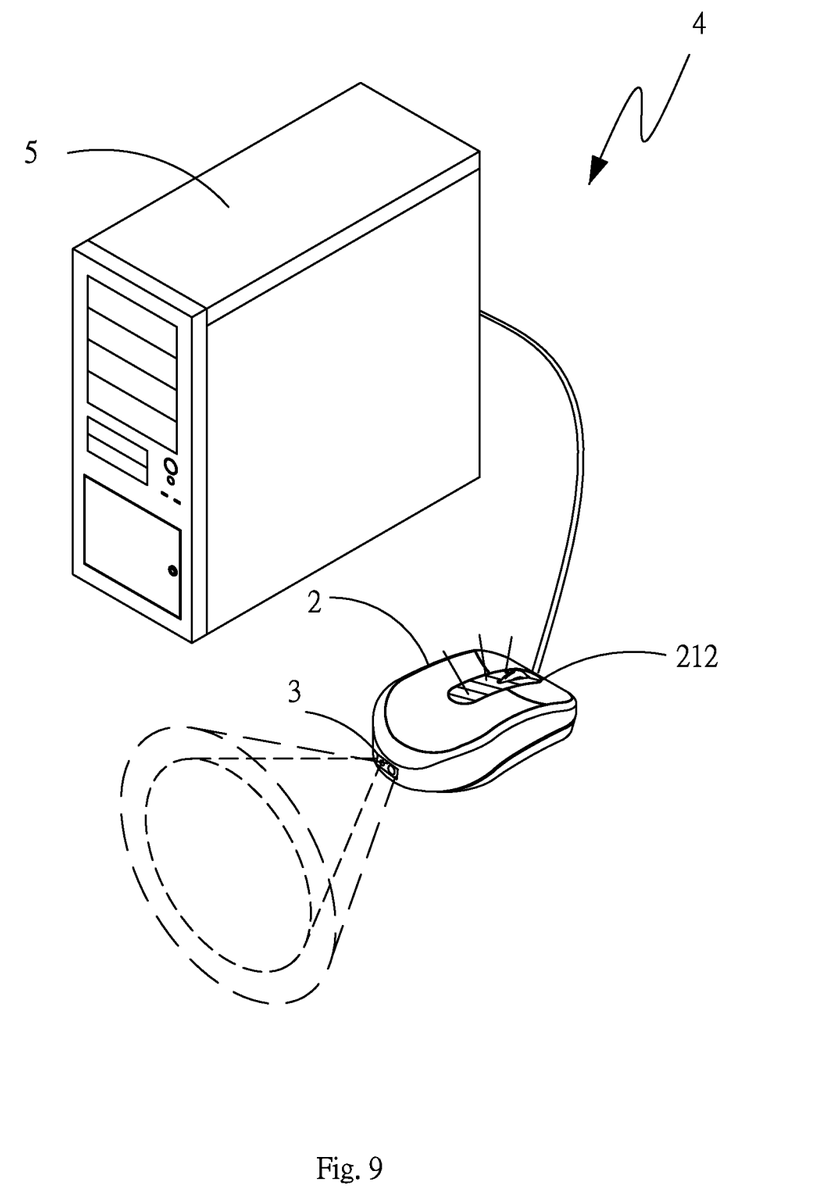
FIG. 9 is a second schematic view of the implementation of the computer control system of the present invention.

Referring to the foregoing drawings and FIGS. 8 and 9 as well, which are first schematic view and second schematic view of the implementation of the computer control system 4 of the present invention. When the computer control system 4 is in use, the light source emitting unit 31 continuously emits a laser light of a specific wavelength range, and the light source receiving unit 32 receives a reflected light of the laser light. If the user approaches the mouse device 1 or gestures near the mouse device 1, the light source receiving unit 32 receives the reflected light reflected by the user or receives the gestures by the reflected light. The optical sensing module 3 generates a sensing signal after the light source receiving unit 32 receives the reflected light, the sensing signal is transmitted to the mouse processing unit 22, and the mouse processing unit 22 generates the initial control signal to drive the light-emitting component 212 to generate the initial light source of the initial setting command. The mouse processing unit 22 transmits the sensing signal to the signal connection interfaces 51 of the host computer 5 via the signal transmission interface 23. The signal connection interfaces 51 transmit the sensing signal to the host processing unit 52, and the host processing unit 52 generates the advanced control signal to drive the operation unit 53 to generate the actions of the advanced setting command 521. The actions comprise the host processing unit 52 generates the advanced control signal to drive the light-emitting component 212 to generate the advanced light source of the advanced setting command 521, and the host processing unit 52 generates the advanced control signal to drive the operation unit 53 to generate the actions of the advanced setting command 521. Wherein the host processing unit 52 transmits the advanced control signal to the signal transmission interface 23 of the mouse 2 via the signal connection interfaces 51. The signal transmission interface 23 transmits the advanced control signal to the mouse processing unit 22, and the mouse processing unit 22 drives the light-emitting component 212 to generate the advanced light source of the advanced setting command 521. The other action is the mouse processing unit 22 transmits the sensing signal to the host processing unit 52 of the host computer 5, and the host processing unit 52 generates the advanced control signal to drive the operation unit 53 to generate the actions of the advanced setting command 521. Wherein the operation unit 53 can be a computer device disposed in the host computer 5 such as a CPU radiating module, a display card, a motherboard, a memory, a power supply, a fan, an independent sound card, or a cooling device, and the operation unit 53 is also provided with a light-emitting element capable of generating a light source. When the host processing unit 52 drives the operation unit 53 by the advanced control signal, the light-emitting elements on the operation units 53 generate the advanced light source of the advanced setting command 521. Wherein the advanced light source can be a fixed light source or an action light source, the fixed light source is a light source of monochromatic illumination, and the action light source can be a light source that is not only a simple light, such as a flashing light or an electronic scroll or a change in the color of the light. Thereby when the user approaches the mouse device 1, the optical sensing module 3 senses that the user approaches the mouse 2 or generation of gestures to generate the sensing signal, and the mouse processing unit 22 drives the light-emitting component 212 to generate the action light source of the initial setting command, and the host processing unit 52 generates the advanced control signal to drive the operation unit 53 to generate the actions of the advanced setting command 521, and thus achieving the effects of automatically causing the mouse 2 to generate the action light source and the host computer 5 to generate actions to improve the use experience.

Figure 10:
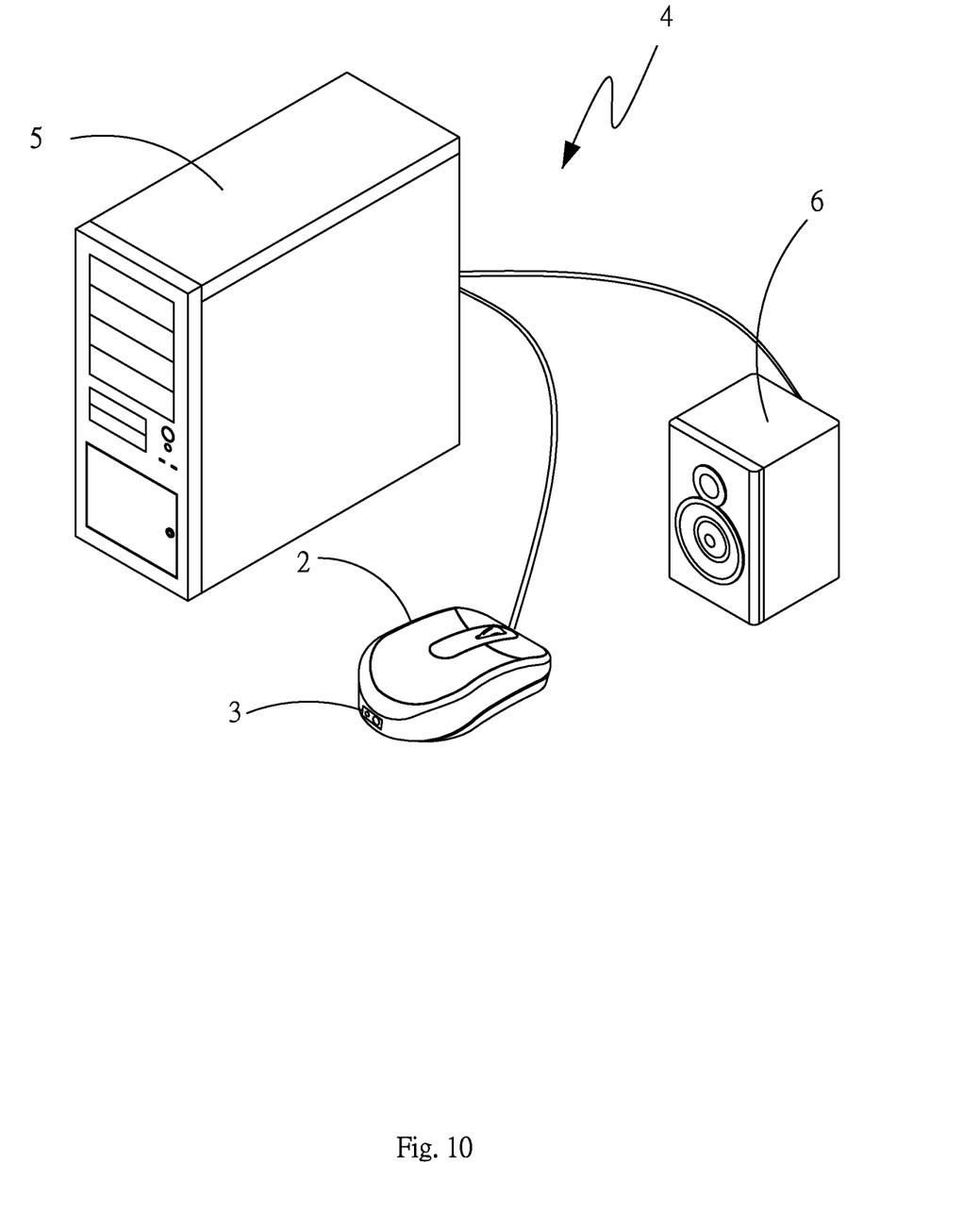
FIG. 10 is a third schematic view of the implementation of the computer control system of the present invention.
Figure 11:
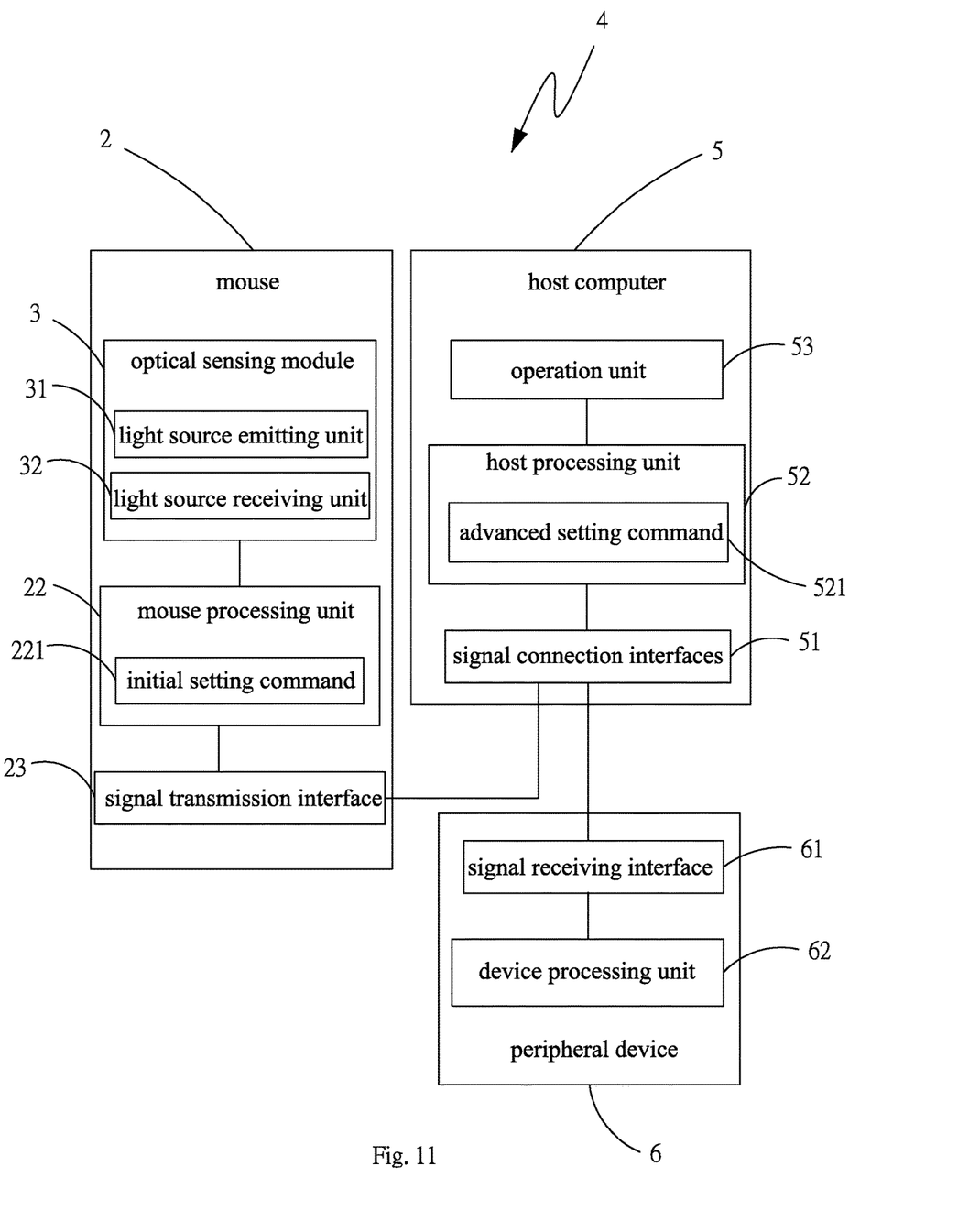
FIG. 11 is a block diagram of the implementation of the computer control system of the present invention.

Please refer to the foregoing drawings and FIGS. 10 and 11 as well, which are third schematic view and block diagram of the implementation of the computer control system 4 of the present invention. The computer control system 4 further comprises at least one peripheral device 6, wherein the peripheral device 6 can be a peripheral device of wireless or wired transmission such as a keyboard, a mouse pad, an earphone, a speaker, a printer, a monitor, an external light-emitting element. The peripheral device 6 has a signal receiving interface 61 and a device processing unit 62. The mouse processing unit 22 transmits the sensing signal to the host processing unit 52 of the host computer 5, and the host processing unit 52 transmits the advanced control signal to the signal receiving interface 61 of the peripheral device 6 via the signal connection interfaces 51. The signal receiving interface 61 transmits the advanced control signal to the device processing unit 62, and the device processing unit 62 drives the peripheral device 6 to generate the actions of the advanced setting command 521, such as the keyboard generating a light source of advanced action, or the speaker generating a sound effect of advanced action, or the printer generating a light source of advanced action, etc. Thereby when the user approaches the mouse device 1, the optical sensing module 3 senses that the user approaches the mouse 2 or generation of gestures to generate the sensing signal, the mouse processing unit 22 drives the light-emitting component 212 to generate the initial light source of the initial setting command, the host processing unit 52 generates the advanced control signal to drive the operation unit 53 to generate the actions of the advanced setting command 521, and at the same time, the device processing unit 62 drives the peripheral device 6 to generate the actions of the advanced setting command 521. Thus achieving the effects of automatically causing the mouse 2 to generate the action light source as well as the host computer 5 and the peripheral device 6 to generate actions to improve the use experience.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A computer control system, comprising:
    a host computer, the host computer having a plurality of signal connection interfaces, a host processing unit and at least one operation unit, the signal connection interfaces being electrically connected to the host processing unit, and the host processing unit having an advanced setting command and being capable of generating at least one advanced control signal according to the advanced setting command;
    a mouse, the mouse being electrically connected to the host computer, the mouse being formed with a hold surface thereon and disposed with at least one signal transmission interface, the hold surface being provided with a plurality of press buttons and at least one light-emitting component, inside the mouse being disposed with a mouse processing unit electrically connected to the press buttons and the light-emitting component, and the mouse processing unit having an initial setting command and being capable of generating at least one initial control signal according to the initial setting command; and
    an optical sensing module, the optical sensing module being disposed at a position of the hold surface and electrically connected to the mouse processing unit, the optical sensing module having a light source emitting unit and a light source receiving unit, the light source emitting unit emitting a light of a specific wavelength range, after the light source receiving unit receiving a reflected light, the optical sensing module generating a sensing signal to the mouse processing unit, the mouse processing unit generating the initial control signal to drive the light-emitting component to generate an initial light source of the initial setting command, the mouse processing unit transmitting the sensing signal to the host processing unit of the host computer, and the host processing unit generating the advanced control signal to drive the light-emitting component to generate advanced light source of the advanced setting command;
    wherein the host processing unit transmits the advanced control signal to the signal transmission interface of the mouse via the signal connection interfaces, the signal transmission interface transmits the advanced control signal to the mouse processing unit, and the mouse processing unit drives the light-emitting component to generate the advanced light source of the advanced setting command.

2. The computer control system as claimed in claim 1, wherein the mouse processing unit transmits the sensing signal to the signal connection interfaces of the host computer via the signal transmission interface, and the signal connection interfaces transmit the sensing signal to the host processing unit.

3. The computer control system as claimed in claim 1, wherein the host processing unit generates the advanced control signal to drive the operation unit to generate the actions of the advanced setting command.

4. A computer control system, comprising:
    a host computer, the host computer having a plurality of signal connection interfaces, a host processing unit and at least one operation unit, the signal connection interfaces being electrically connected to the host processing unit, and the host processing unit having an advanced setting command and being capable of generating at least one advanced control signal according to the advanced setting command;
    a mouse, the mouse being electrically connected to the host computer, the mouse being formed with a hold surface thereon and disposed with at least one signal transmission interface, the hold surface being provided with a plurality of press buttons and at least one light-emitting component, inside the mouse being disposed with a mouse processing unit electrically connected to the press buttons and the light-emitting component, and the mouse processing unit having an initial setting command and being capable of generating at least one initial control signal according to the initial setting command; and
    an optical sensing module, the optical sensing module being disposed at a position of the hold surface and electrically connected to the mouse processing unit, the optical sensing module having a light source emitting unit and a light source receiving unit, the light source emitting unit emitting a light of a specific wavelength range, after the light source receiving unit receiving a reflected light, the optical sensing module generating a sensing signal to the mouse processing unit, the mouse processing unit generating the initial control signal to drive the light-emitting component to generate an initial light source of the initial setting command, the mouse processing unit transmitting the sensing signal to the host processing unit of the host computer, and the host processing unit generating the advanced control signal to drive the operation unit to generate actions of the advanced setting command;

at least one peripheral device, the peripheral device having a signal receiving interface and a device processing unit, wherein the signal receiving interface is electrically connected to the signal connection interfaces, the mouse processing unit transmits the sensing signal to the host processing unit of the host computer, and the host processing unit generates the advanced control signal to drive the peripheral device to generate the actions of the advanced setting command;

wherein the host processing unit transmits the advanced control signal to the signal receiving interface of the peripheral device via the signal connection interfaces, the signal receiving interface transmits the advanced control signal to the device processing unit, and the device processing unit drives the peripheral device to generate the actions of the advanced setting command.

5. The computer control system as claimed in claim 4, wherein the peripheral device can be a device of wireless or wired transmission such as a keyboard, a mouse pad, an earphone, a speaker, a printer, a monitor, or an external light-emitting element, and the operation unit can be a unit disposed in the host computer such as a CPU radiating module, a display card, a motherboard, a memory, a power supply, a fan, an independent sound card, or a cooling device, and the operation units are provided with a light-emitting element capable of generating a light source.

* * * * *